United States Patent
Lee et al.

(10) Patent No.: US 10,545,280 B2
(45) Date of Patent: Jan. 28, 2020

(54) METHOD OF GENERATING DIRECTIONAL RAYS AND APPARATUSES PERFORMING THE METHOD

(71) Applicant: Samsung Electronics Co., Ltd., Suwon-si, Gyeonggi-do (KR)

(72) Inventors: Jinho Lee, Suwon-si (KR); Young Ju Jeong, Yongin-si (KR); Hyunjoon Kim, Seoul (KR); Dong Kyung Nam, Yongin-si (KR); Yoonsun Choi, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 123 days.

(21) Appl. No.: 15/373,727

(22) Filed: Dec. 9, 2016

(65) Prior Publication Data
US 2017/0199317 A1    Jul. 13, 2017

(30) Foreign Application Priority Data

Jan. 7, 2016    (KR) .................. 10-2016-0001981

(51) Int. Cl.
*G02F 1/13357* (2006.01)
*G02B 6/00* (2006.01)
*F21V 8/00* (2006.01)

(52) U.S. Cl.
CPC ......... *G02B 6/0051* (2013.01); *G02B 6/0026* (2013.01); *G02B 6/0068* (2013.01)

(58) Field of Classification Search
CPC ............ G02F 1/133615; G02B 6/0026; G02B 6/0051; G02B 6/0068

USPC .......................................................... 362/606
See application file for complete search history.

(56) References Cited

U.S. PATENT DOCUMENTS

| | | | | |
|---|---|---|---|---|
| 5,446,567 A | * | 8/1995 | Haim ................ | G02F 1/133512 349/110 |
| 7,164,454 B2 | * | 1/2007 | Numata .............. | G02B 6/0053 349/57 |
| 9,584,778 B2 | * | 2/2017 | Ellwood, Jr. ........ | G03B 21/005 |
| 2005/0041174 A1 | * | 2/2005 | Numata .............. | G02B 6/0053 349/61 |
| 2012/0200807 A1 | * | 8/2012 | Wei ..................... | G02B 6/0043 349/65 |
| 2014/0036361 A1 | | 2/2014 | Woodgate et al. | |

(Continued)

FOREIGN PATENT DOCUMENTS

| JP | 4930631 B2 | 5/2012 |
|---|---|---|
| JP | 2012226199 A | 11/2012 |

(Continued)

OTHER PUBLICATIONS

Extended European Search Report dated May 15, 2017 issued in corresponding European Application No. 17150446.7.

*Primary Examiner* — Karabi Guharay
(74) *Attorney, Agent, or Firm* — Harness, Dickey & Pierce, P.L.C.

(57) ABSTRACT

A method of generating directional rays and apparatuses performing the method are disclosed. A backlight may include a light source configured to generate a ray, a light guide plate configured to transfer the ray to a display panel, and a directional pixel configured to generate a plurality of directional rays by scattering the ray, in which each of the directional rays may be incident at a corresponding subpixel in the display panel.

17 Claims, 9 Drawing Sheets

(56) References Cited

U.S. PATENT DOCUMENTS

2014/0300840 A1 10/2014 Fattal et al.
2014/0300947 A1 10/2014 Fattal et al.
2014/0300960 A1 10/2014 Santori et al.

FOREIGN PATENT DOCUMENTS

| JP | 2013101827 A | 5/2013 |
| JP | 2013104914 A | 5/2013 |
| JP | 2013104916 A | 5/2013 |
| JP | 5545068 B2 | 7/2014 |
| JP | 5674023 B2 | 2/2015 |
| JP | 5776674 B2 | 9/2015 |
| WO | WO-2013/162609 A1 | 10/2013 |
| WO | WO-2013/180725 A1 | 12/2013 |

* cited by examiner

METHOD OF GENERATING DIRECTIONAL RAYS AND APPARATUSES PERFORMING THE METHOD

CROSS-REFERENCE TO RELATED APPLICATION

This application claims under 35 U.S.C. § 119 to Korean Patent Application No. 10-2016-0001981, filed on Jan. 7, 2016, in the Korean Intellectual Property Office, the entire contents of which are incorporated herein by reference in its entirety.

BACKGROUND

1. Field

At least one example embodiment relates to a method of generating directional rays and apparatuses performing the method.

2. Description of the Related Art

To effectively express a three-dimensional (3D) image that provides a stereoscopic sense, images of different viewpoints may need to be provided to a left eye and a right eye of a user.

To provide a 3D image in a glassless state, the 3D image may need to be spatially segmented based on a viewpoint. A glassless 3D display may segment an image mainly using an optical controller and a display, in a space. The optical controller may be, for example, lenticular lenses and parallax barriers. The lenticular lenses may control each pixel image to be expressed in a direction, and the parallax barriers may control a pixel to be viewed from a direction through a slit.

Recently, a diffraction grating has been used as the optical controller. The diffraction grating may change a path of light to be output by adjusting an incidence angle of light to be incident on the diffraction grating, a line width of the diffraction grating, and the like. Thus, a 3D image may be expressed using such a diffraction grating corresponding to each subpixel of a display.

SUMMARY

Some example embodiments relate to a backlight.

In some example embodiment, the backlight may include a light source configured to generate a ray, a light guide plate configured to transfer the ray to a display panel, and a directional pixel configured to generate a plurality of directional rays by scattering the ray. Each of the directional rays may be incident at a corresponding subpixel included in the display panel.

The light source may be a white light source.

The white light source may be configured as at least one of a white light emitting diode (LED) and a red, green, blue (RGB) LED chip.

The white light source may be configured as at least one of a white laser and an RGB laser chip.

The directional pixel may be provided on at least one of a top surface and a bottom surface of the light guide plate.

The backlight may further include a band-pass filter configured to allow a plurality of selected wavelengths of the ray to pass through.

The directional pixel may have a size less than or equal to a size of a unit pixel of the display panel.

The directional pixel may be arranged to allow each of the directional rays to be incident at a corresponding viewpoint location.

The directional pixel may be arranged to allow the directional rays to be scattered uniformly.

At least one of an output direction of the directional rays are and an angular spread of the directional rays may be adjusted based on at least one of a grating period, a grating width, and a grating length of a diffraction grating included in the directional pixel and an arrangement angle at which the diffraction grating is inclined.

Other example embodiments relate to a display device.

In some example embodiments, the display device may include a backlight including a directional pixel configured to generate a plurality of directional rays by scattering a ray, and a display panel configured to display an image using the directional rays. Each of the directional rays may be incident at a corresponding subpixel included in the display panel.

Other example embodiments relate to a method of generating directional rays.

In some example embodiments, the method may include generating, by a light source, a ray to be transferred to a display panel and generating, by a directional pixel, a plurality of directional rays by scattering the ray. Each of the directional rays may be incident at a corresponding subpixel included in the display panel.

The light source may be a white light source.

The white light source may be configured as at least one of a white LED and an RGB LED chip.

The white light source may be configured as at least one of a white laser and an RGB laser chip.

The method may further include allowing a plurality of selected wavelengths of the ray to pass through.

The directional pixel may have a size less than or equal to a size of a unit pixel of the display panel.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be a computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to limit the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In addition, terms such as first, second, A, B, (a), (b), and the like may be used herein to describe components. Each of these terminologies is not used to define an essence, order or sequence of a corresponding component but used merely to distinguish the corresponding component from other component(s).

It should be noted that if it is described in the disclosure that one component is "connected," "coupled," or "joined" to another component, a third component may be "connected," "coupled," and "joined" between the first and second components, although the first component may be directly connected, coupled or joined to the second component.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms including technical and scientific terms used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Various example embodiments will now be described more fully with reference to the accompanying drawings in which some example embodiments are shown. In the drawings, the thicknesses of layers and regions are exaggerated for clarity.

Figure 1:
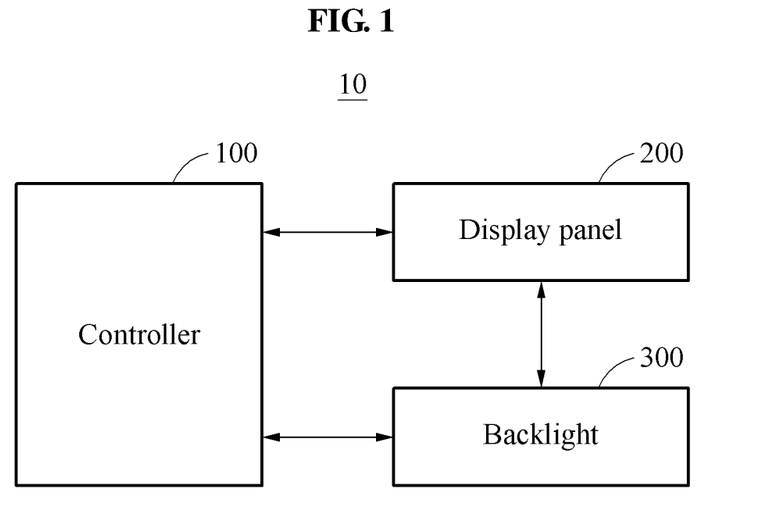
FIG. 1 is a diagram illustrating a configuration of a display device according to at least one example embodiment.

FIG. 1 is a diagram illustrating a configuration of a display device 10 according to at least one example embodiment.

Referring to FIG. 1, the display device 10 includes a controller 100, a display panel 200, and/or a backlight 300.

The display device 10 may generate an image based on image information, and display the generated image. For example, the image may be a two-dimensional (2D) image or a three-dimensional (2D) image.

In addition, the display device 10 may generate a 3D image by adjusting a direction of a ray using a diffraction grating and forming a desired viewpoint image at a viewing location.

The display device 10 may be a 3D display device, for example, a device to implement a glassless 3D display. For example, the display device 10 may be provided in a television (TV), a digital information display (DID), a monitor, a personal computer (PC), or a portable device.

The portable device may be, for example, a laptop computer, a mobile phone, a smartphone, a tablet PC, a mobile Internet device (MID), a personal digital assistant (PDA), an enterprise digital assistant (EDA), a digital still camera, a digital video camera, a portable multimedia player (PMP), a personal or portable navigation device (PND), a handheld game console, an e-book, and a smart device. The smart device may be, for example, a smart watch or a smart band.

The display device 10 may be any device that may display an image.

The controller 100 may control an overall operation of the display device 10. The controller 100 may be configured as a printed circuit board (PCB) such as a motherboard, an integrated circuit (IC), or a system on chip (SoC). The controller 100 may be, for example, an application processor.

The controller 100 may control the display panel 200 and the backlight 300 based on the image information. For example, the image information may be 2D image information or 3D image information.

In addition, the controller 100 may generate an image based on the image information and transfer the image to the display panel 200.

The display panel 200 may display the image under control of the controller 100. For example, the display panel 200 may display the image using a plurality of directional rays that reaches the display panel 200, or is incident on the display panel 200, from the backlight 300 under control of the controller 100.

The display panel 200 may be configured as a liquid crystal display (LCD) panel. The display panel 200 may also be configured as, for example, a touch screen panel, a thin film transistor-LCD (TFT-LCD) panel, a liquid emitting diode (LED) display panel, an organic LED (OLED) display panel, an active matrix OLED (AMOLED) display panel, or a flexible display panel.

The display panel 200 may include a plurality of unit pixels. Each of the unit pixels may include a plurality of subpixels of different colors. For example, each of the subpixels may be a red subpixel, a green subpixel, or a blue subpixel. For another example, each of the subpixels may be a white subpixel or a subpixel of another color.

The backlight 300 may generate a plurality of directional rays under control of the controller 100. The backlight 300 may generate the directional rays by scattering a ray through at least one directional pixel.

Each of directional rays generated through one directional pixel may be incident at a corresponding subpixel include in the display panel 200. The display panel 200 may display the image through the directional rays to be incident at corresponding subpixels.

Figure 2:
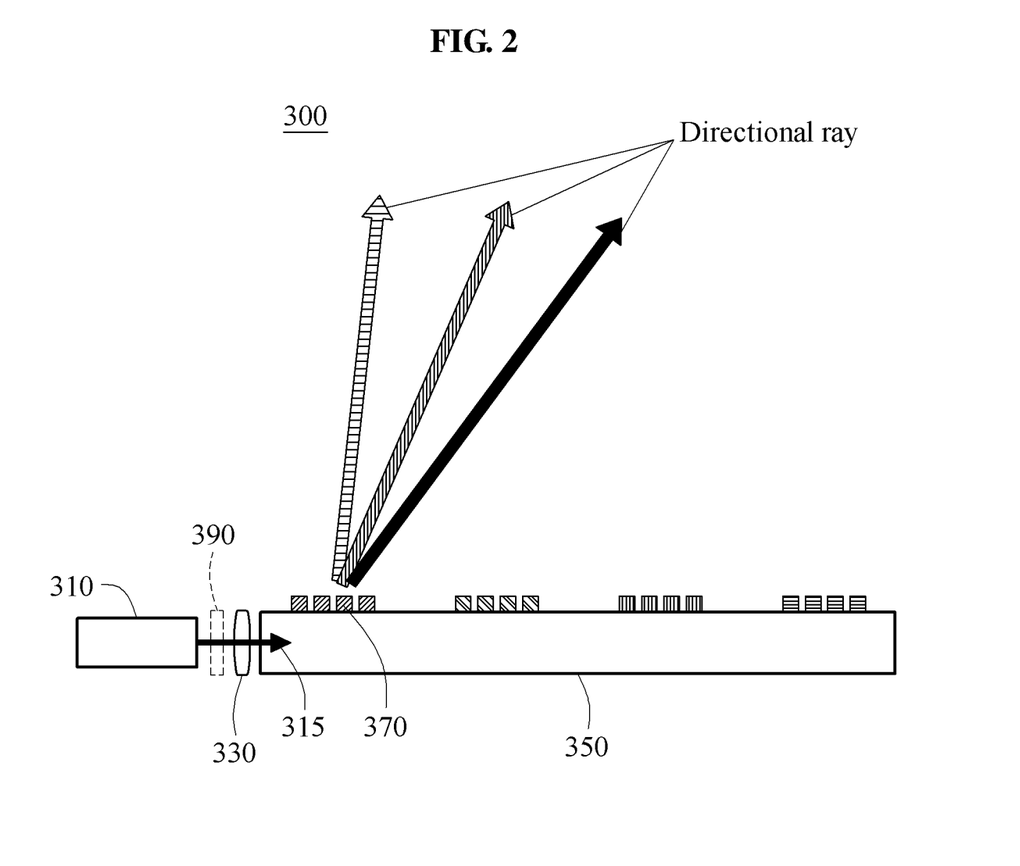
FIG. 2 is a diagram illustrating a structure of a backlight illustrated in FIG. 1.
Figure 3:
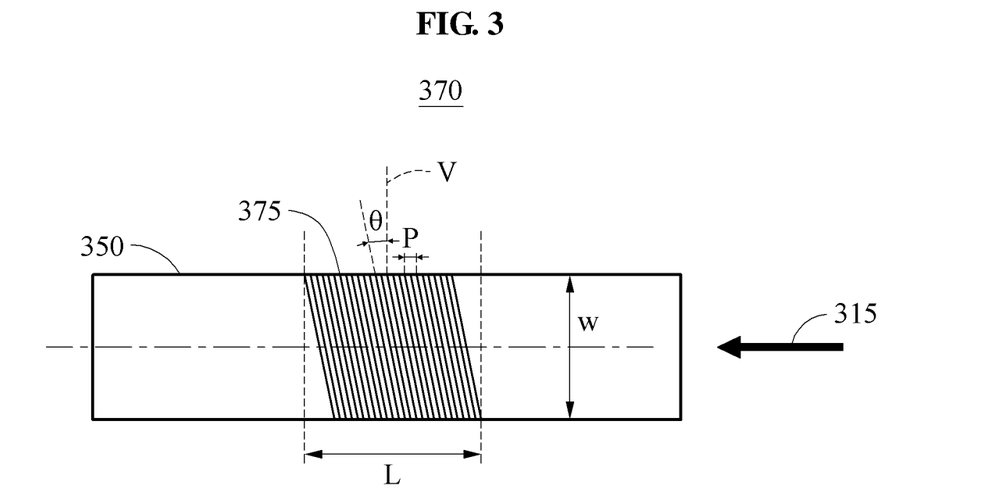
FIG. 3 is a diagram illustrating an example of a directional pixel illustrated in FIG. 2.
Figure 4:
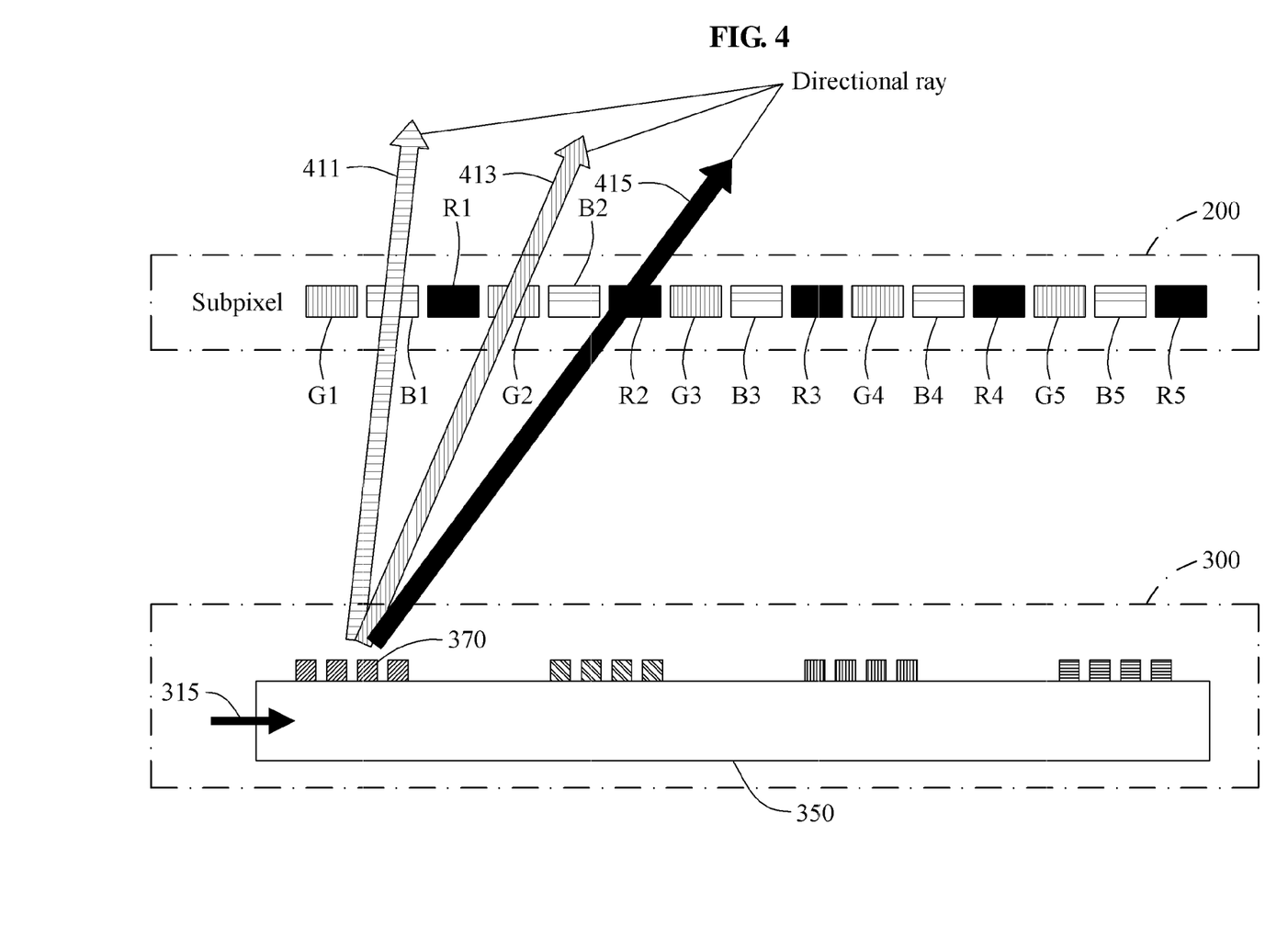
FIG. 4 is a diagram illustrating a corresponding relationship between a plurality of directional rays generated by a directional pixel and a plurality of subpixels included in a display panel according to at least one example embodiment.

FIG. 2 is a diagram illustrating a structure of the backlight 300 illustrated in FIG. 1. FIG. 3 is a diagram illustrating an example of a directional pixel illustrated in FIG. 2. FIG. 4 is a diagram illustrating a corresponding relationship between a plurality of directional rays generated by a directional pixel and a plurality of subpixels included in a display panel according to at least one example embodiment.

Referring to FIGS. 1 through 4, the backlight 300 includes a light source 310, a lens 330, a light guide plate 350, and at least one directional pixel 370.

The light source 310 may generate a ray 315. The light source 310 may be, for example, a white light source, and thus generate a white ray. The light source 310 may be provided in at least one form of an LED and a laser.

For example, the white light source as the light source 310 may be configured as at least one of a white LED and a red, green, blue (RGB) LED chip. For another example, the white light source may be configured as at least one of a white laser and an RGB laser chip.

Although a single light source is illustrated as the light source 310 in FIG. 2, the number of light sources is not limited thereto, and thus a plurality of light sources may be provided as the light source 310.

The lens 330 may concentrate the ray 315 onto the light guide plate 350. The lens 330 may allow the ray 315 to be incident on the light guide plate 350.

The light guide plate 350 may transfer the ray 315 to the display panel 200. For example, the light guide plate 350 may uniformly transfer the ray 315 to the display panel 200.

The directional pixel 370 may include a diffraction grating 375, and generate a plurality of directional rays, for example, a directional ray 411, a directional ray 413, and a directional ray 415, by scattering the ray 315 through the diffraction grating 375. Each of the directional rays 411, 413, and 415 generated by the directional pixel 370 may be incident at a corresponding subpixel included in the display panel 200, for example, a subpixel B1, a subpixel G2, and a subpixel R2, respectively.

For example, the directional rays 411, 413, and 415 may be a blue directional ray 411, a green directional ray 413, and a red directional ray 415, respectively. The red directional ray 415 may be incident at the subpixel R2 corresponding to the red directional ray 415, the green directional ray 413 at the subpixel G2 corresponding to the green directional ray 413, and the blue directional ray 411 at the subpixel B1 corresponding to the blue directional ray 411.

The diffraction grating 375 may be provided on at least one of a top surface or a bottom surface of the light guide plate 350. For example, the directional pixel 370 may be located on the top surface of the light guide plate 350. Alternatively, the directional pixel 370 may be located on the bottom surface of the light guide plate 350. For simplicity of description, FIG. 2 illustrates the directional pixel 370 being located on the top surface of the light guide plate 350.

In such a case, the diffraction grating 375 may be arranged in parallel to one another with a predetermined or desired grating period P. In addition, the diffraction grating 375 may be inclined at an angle Θ against a vertical direction V of the ray 315 to be incident on the light guide plate 350.

The ray 315 may pass through the diffraction grating 375, and become the directional rays 411, 413, and 415. An angular spread ΔΘ of the directional ray 411, 413, or 415 may be represented by Equation 1 below. The angular spread ΔΘ may indicate an output angle at which the directional ray 411, 413, or 415 is to be output.

$$\Delta\Theta \approx \frac{4\lambda}{\pi L}\left(\frac{4\lambda}{\pi W}\right) \qquad [\text{Equation 1}]$$

In Equation 1, "λ" denotes a wavelength of a directional ray, for example, the directional ray 411, 413, or 415.

At least one of a direction, or an output direction, of the directional ray 411, 413, or 415 and the angular spread ΔΘ may be adjusted by a grating length L, a grating width W, an arrangement angle Θ at which the diffraction grating 375 is inclined, and the grating period P. The grating length L may affect the direction of the directional ray 411, 413, or 415, and the grating width W may affect the direction of the directional ray 411, 413, or 415, and the angular spread ΔΘ.

The backlight 300 may further include a band-pass filter 390 configured to allow only a plurality of selected wavelengths of the ray 315 generated by the light source 310 to pass through. For example, the wavelengths may include a red wavelength, a green wavelength, and a blue wavelength. Thus, the directional pixel 370 may generate the red directional ray 415, the green directional ray 413, and the blue directional ray 411 by scattering, through the diffraction grating 375, the ray 315 having only the red wavelength, the green wavelength, and the blue wavelength.

By configuring the light source 310 as the white light source, the directional pixel 370 may generate the directional rays 411, 413, and 415 by scattering the ray 315 generated by the light source 310 through the diffraction grating 375. The directional rays 411, 413, and 415 may be incident at the corresponding subpixels B1, G2, and R2 included in the display panel 200.

Since the directional rays 411, 413, and 415 generated by the directional pixel 370 are incident at the corresponding subpixels B1, G2, and R2 included in the display panel 200, the directional pixel 370 of various sizes may be arranged.

An arrangement of the directional pixel 370 will be described in detail with reference to FIGS. 5 through 8.

Figure 6:
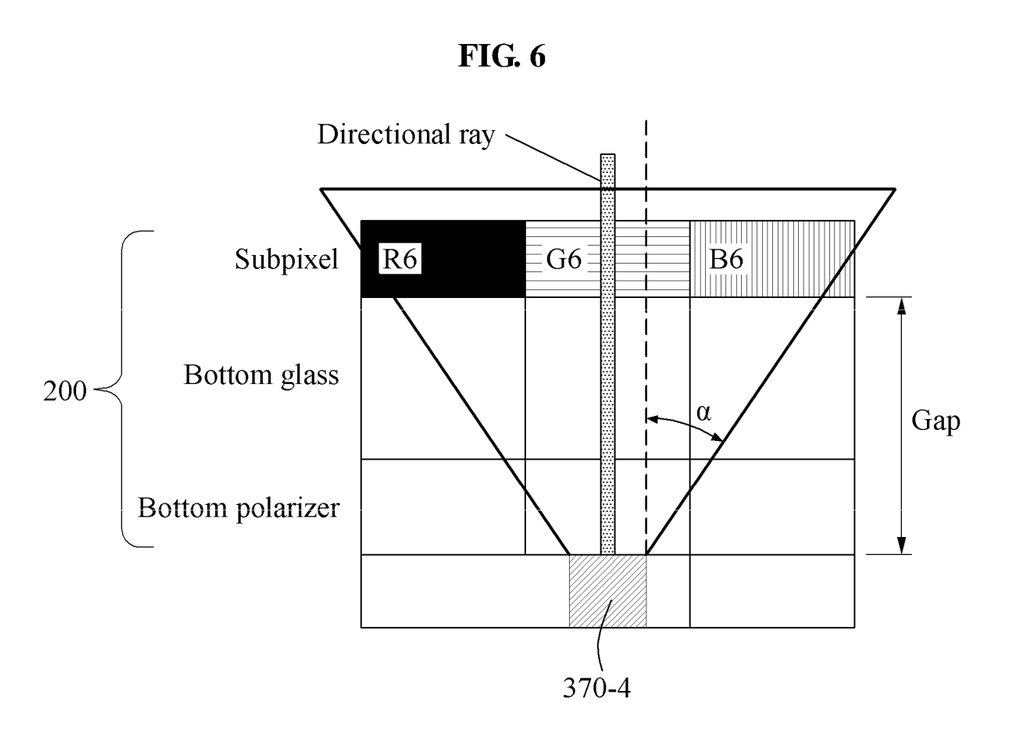
FIG. 6 is a diagram illustrating scattering by a directional pixel illustrated in FIG. 5.
Figure 7:
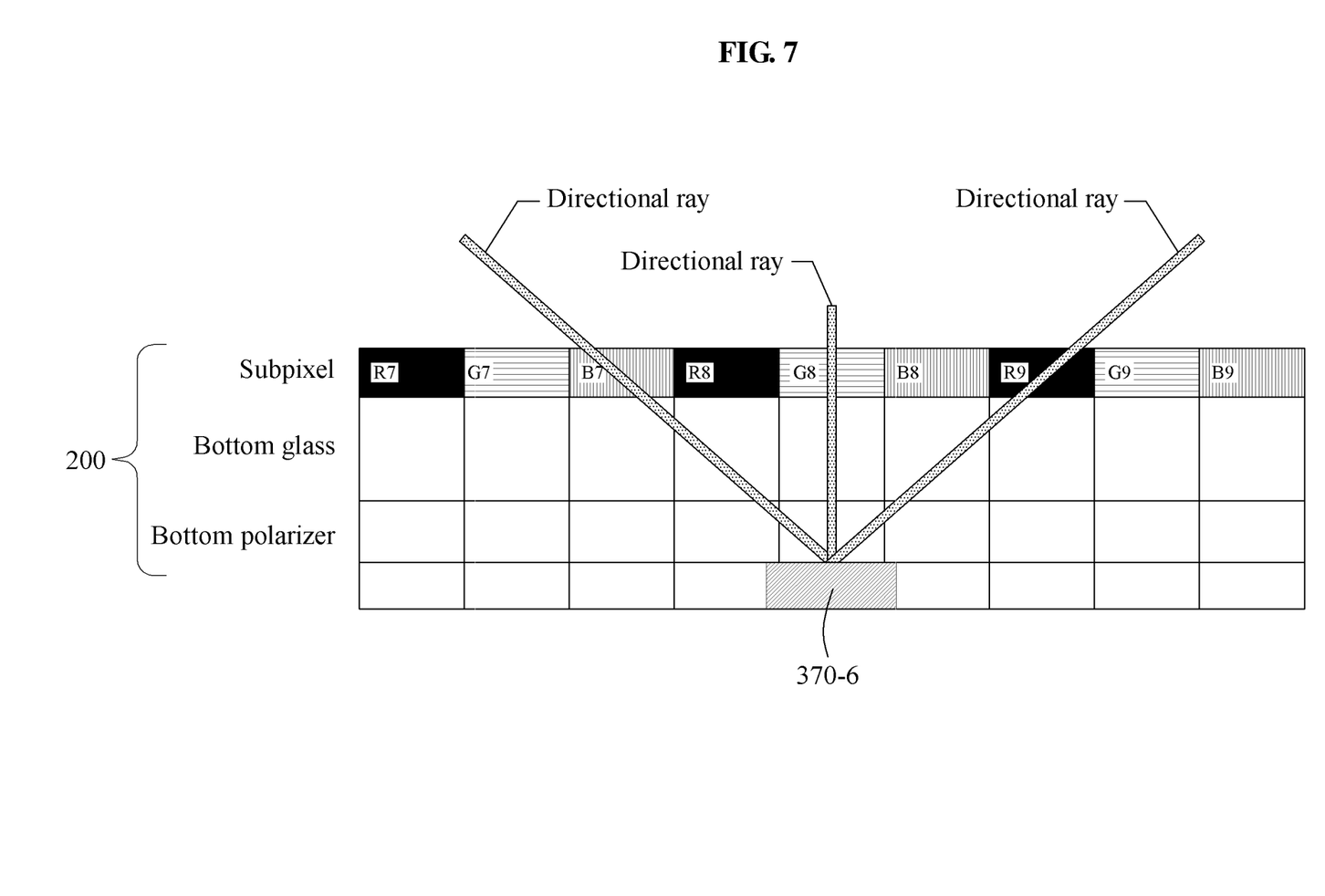
FIG. 7 is a diagram illustrating an arrangement of directional pixels illustrated in FIG. 2.
Figure 8:
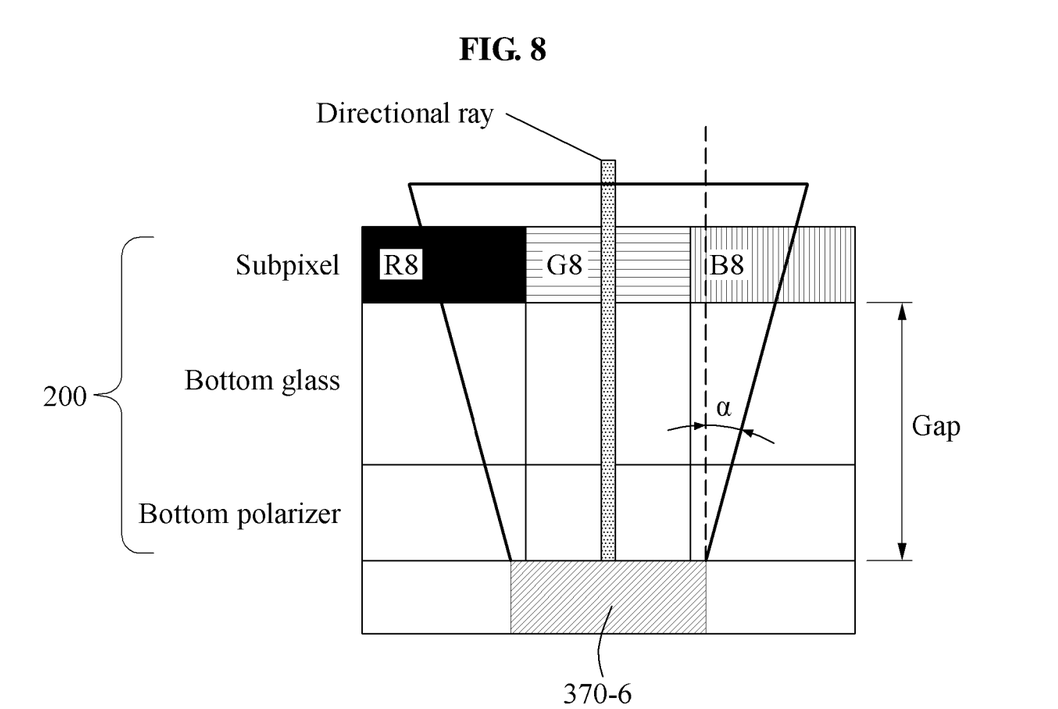
FIG. 8 is a diagram illustrating scattering by a directional pixel illustrated in FIG. 7.

An example of an arrangement of the directional pixel 370, under the assumption that the light source 310 is configured as a single color light source or a multi-color light source in lieu of a white light source, will be described with reference to FIGS. 5 and 6 before describing another example of an arrangement of the directional pixel 370 with reference to FIGS. 7 and 8. For simplicity of description, FIGS. 5 through 8 illustrate the display panel 200 including a bottom polarizer, a bottom glass, and subpixels.

Figure 5:
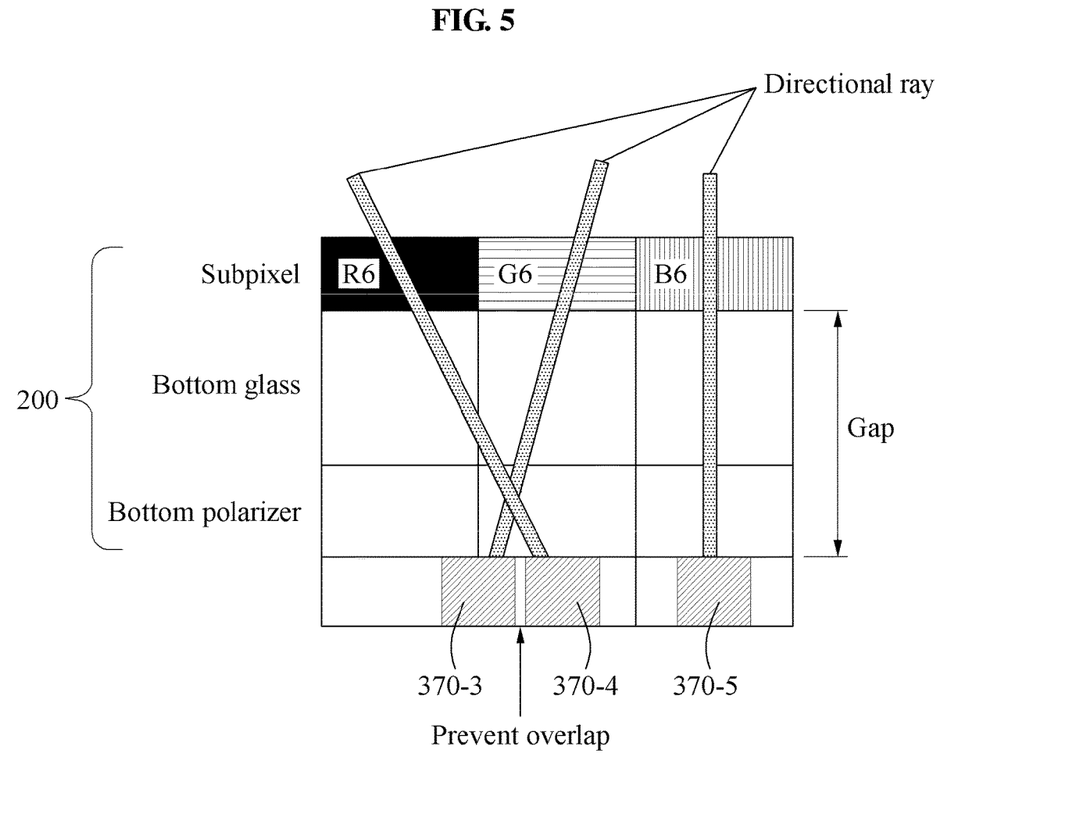
FIG. 5 is a diagram illustrating an arrangement in which each directional pixel corresponds to each subpixel in a display panel according to at least one example embodiment.

FIG. 5 is a diagram illustrating an arrangement in which each directional pixel corresponds to each subpixel in the display panel 200. FIG. 6 is a diagram illustrating scattering by a directional pixel illustrated in FIG. 5.

Referring to FIG. 5, when the light source 310 is configured as a single color light source or a multi-color light source in lieu of a white light source, directional pixels, for example, a directional pixel 370-3, a directional pixel 370-4, and a directional pixel 370-5, may need to be arranged to correspond to a subpixel, for example, a subpixel G6, a subpixel R6, and a subpixel B6, respectively, to prevent directional rays of different colors from being mixed.

The directional pixel 370-3 may be arranged to correspond to the subpixel G6, the directional pixel 370-4 to the subpixel R6, and the directional pixel 370-5 to the subpixel B6. Thus, a directional ray generated through the directional pixel 370-3 may be incident at the subpixel G6, a directional ray generated through the directional pixel 370-4 may be incident at the subpixel R6, and a directional ray 411, 413, 415 generated through the directional pixel 370-5 may be incident at the subpixel B6.

For example, when the display device 10 performs a multiview method to implement a 3D display, the directional pixels 370-3, 370-4, and 370-5 may need to be arranged to control the directional rays to converge on a specific viewpoint location. In addition, when the display device 10 performs a light-field method to implement a 3D display, the directional pixels 370-3, 370-4, and 370-5 may need to be arranged to control the directional rays to be scattered uniformly. In such an example, the directional pixels 370-3, 370-4, and 370-5 of a greater size may need to be arranged so that a greater amount of the directional rays generated by the directional pixels 370-3, 370-4, and 370-5 may be transferred to the display panel 200, and thus a brighter display may be obtained.

As illustrated in FIG. 5, when the light source 310 is configured as a single color light source or a multi-color light source, the directional pixels 370-3, 370-4, and 370-5 may need to be arranged to correspond to the subpixels G6, R6, and B6, respectively, and thus a size of each directional pixel may need to be reduced to prevent the directional pixels 370-3, 370-4, and 370-5 from overlapping to one another.

When a size of each directional pixel decreases, a smaller amount of directional rays generated by the directional pixel may be transferred to the display panel 200, and thus a brightness of a screen of the display panel 200 may decrease due to a decrease in efficiency.

Referring to FIG. 6, a decrease in a size of the directional pixels 370-3, 370-4, and 370-5 may result in a degradation of brightness of the screen of the display panel 200 and also in a mixture of colors and an increase in a cross-talk, which is a degradation of an image quality of the display device 10, due to scattering of the directional pixels 370-3, 370-4, and 370-5. To provide convenience in describing scattering of a directional ray, FIG. 6 illustrates the directional pixel 370-4 arranged to correspond to the subpixel G6, in contrast to FIG. 5.

When a size of the directional pixel 370-4 decreases, an angular spread or a full width at half maximum (FWHM) a of a directional ray may increase and the directional ray may be incident at the subpixel G6 and also at neighboring subpixels of the same color by being scattered, and thus may result in a mixture of colors and an increase in a cross-talk that is a degradation of an image quality of the display device 10. Such an issue may be intensified due to a gap generated by a thickness of the bottom polarizer and the bottom glass of the display panel 200.

FIG. 7 is a diagram illustrating an example of an arrangement of directional pixels illustrated in FIG. 2. FIG. 8 is a diagram illustrating diffusion by a directional pixel illustrated in FIG. 7.

Referring to FIGS. 7 and 8, when the light source 310 is configured as a white light source, a directional pixel 370-6 generates a plurality of directional rays. The directional rays may be incident at corresponding subpixels B7, G8, and R9 included in the display panel 200. Each of subpixels included in the display panel 200, for example, a subpixel R7, a subpixel G7, the subpixel B7, a subpixel R8, the subpixel G8, a subpixel B8, a subpixel R9, a subpixel G9, and the subpixel B9, may have a color filter for a corresponding color. Thus, a ray of another wavelength may not be transmitted, but removed. That is, a directional ray to be applied to a subpixel located in a left and a right side of a corresponding subpixel and having a different color filter from the subpixel may not pass through the display panel 200 and removed.

In comparison to an example illustrated in FIG. 4, the number of directional pixels may be reduced because the light source 310 is configured as a white light source and each of directional rays generated by the directional pixel 370-6 is incident at a corresponding subpixel, for example, the subpixels B7, G8, and R9. Thus, a degree of freedom (DoF) for arranging the directional pixel 370-6 may increase, and the directional pixel 370-6 of various sizes may be arranged.

Although FIGS. 7 and 8 illustrate a size of the directional pixel 370-6 being greater than a single subpixel, a size of a directional pixel is not limited thereto, and thus a directional pixel of various sizes, for example, smaller than or equal to a size of a subpixel, may be arranged.

In comparison to an example illustrated in FIG. 5, the directional pixel 370-6 of a size greater than a size of each of the directional pixels 370-3, 370-4, and 370-5 of FIG. 5 may be arranged. When the number of directional pixels to be arranged decreases and a size of each directional pixel increases, an open area of each directional pixel, for example, the directional pixel 370-6, may increase and a light efficiency may be improved, and thus a brighter screen may be obtained for the display panel 200. A directional ray to be applied to a subpixel located leftwards and rightwards a target subpixel and having a different color filter from the target subpixel may not pass through the display panel 200 and removed more effectively.

As illustrated in FIG. 8, when the size of the directional pixel 370-6 increases, an angular spread α of the directional rays may decrease, and thus the mixture of colors and the cross-talk may be reduced considerably.

However, the size of the directional pixel 370-6 may be less than a size of a unit pixel, for example, a set of one R subpixel, one G subpixel, and one B subpixel. To obtain the open area, the size of the directional pixel 370-6 may need to increase. However, when the size of the directional pixel 370-6 is greater than the size of the unit pixel, a directional ray may be incident at an adjacent subpixel of the same color. When a directional ray greater than the unit pixel is incident, the directional ray may also be incident at an adjacent subpixel of the same color filter, and thus a cross-talk may occur between images.

That is, a maximum size of the directional pixel 370-6 may be less than or equal to the size of the unit pixel of the display panel 200.

When the display device 10 performs a multiview method to implement a 3D display, the directional pixel 370-6 may be arranged to allow each directional ray to be incident at a corresponding viewpoint location. When the display device 10 performs a light-field method to implement a 3D display, the directional pixel 370-6 may be arranged to allow a plurality of directional rays to be scattered uniformly.

Figure 9:
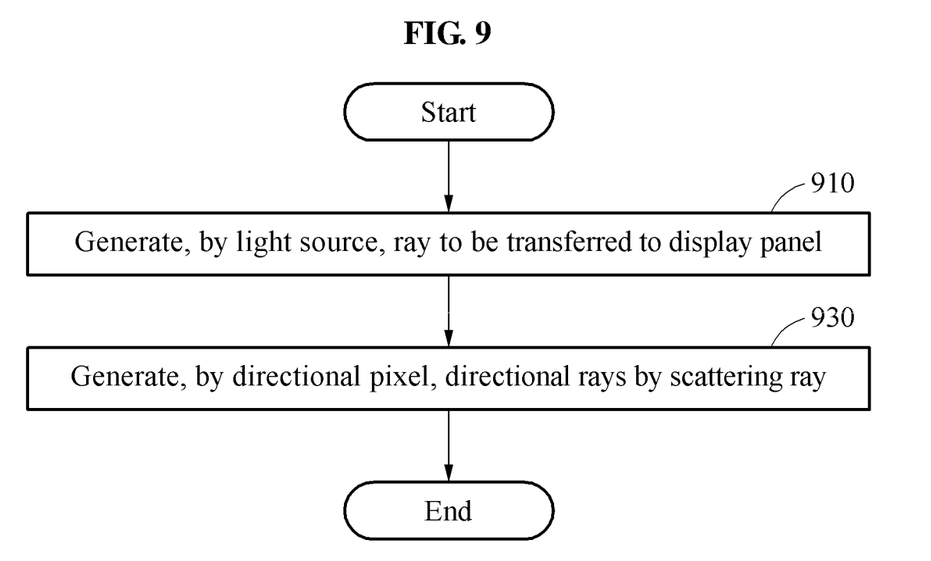
FIG. 9 is a flowchart illustrating a method of generating directional rays according to at least one example embodiment.

FIG. 9 is a flowchart illustrating a method of generating directional rays according to at least one example embodiment.

Referring to FIG. 9, in operation 910, the light source 310 generates the ray 315 to be transferred to the display panel 200. The light source 310 may be, for example, a white light source.

In operation 930, the directional pixel 370 generates a plurality of directional rays by scattering the ray 315 through the diffraction grating 375. Each of the directional rays may be incident at a corresponding subpixel included in the display panel 200.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A backlight, comprising:
   a light source configured to generate a white ray;
   a light guide plate configured to transfer the ray to a display panel; and
   a directional pixel configured to generate a plurality of directional rays having different wavelengths each other by scattering the white ray using a diffraction grating, and
   wherein each of the plurality of directional rays is incident at a corresponding subpixel included in the display panel, and
   a size of the directional pixel is greater than the subpixel.

2. The backlight of claim 1, wherein the light source is a white light source.

3. The backlight of claim 2, wherein the white light source is configured as at least one of a white light emitting diode (LED) and a red, green, blue (RGB) LED chip.

4. The backlight of claim 2, wherein the white light source is configured as at least one of a white laser and an RGB laser chip.

5. The backlight of claim 1, wherein the directional pixel is provided on at least one of a top surface and a bottom surface of the light guide plate.

6. The backlight of claim 1, further comprising:
   a band-pass filter configured to allow a plurality of selected wavelengths of the at least one directional ray to pass through.

7. The backlight of claim 1, wherein the directional pixel has a size less than or equal to a size of a unit pixel of the display panel.

8. The backlight of claim 1, wherein the directional pixel is arranged to allow each of the plurality of directional rays to be incident at a corresponding viewpoint location.

9. The backlight of claim 1, wherein the directional pixel is arranged to allow the plurality of directional rays to be scattered uniformly.

10. The backlight of claim 1, wherein at least one of an output direction of the plurality of directional rays and an angular spread of the plurality of a directional ray is adjusted based on at least one of a grating period, a grating width, and a grating length of the diffraction grating included in the directional pixel and an arrangement angle at which the diffraction grating is inclined.

11. A display device, comprising:
    a backlight including a directional pixel configured to generate a plurality of directional rays by scattering a ray; and
    a display panel configured to display an image using the plurality of directional rays, and
    wherein each of the plurality of directional rays is incident at a corresponding subpixel included in the display panel, and
    a size of the directional pixel is greater than the subpixel.

12. A method of generating a plurality of directional rays, comprising:
    generating, by a light source, a white ray to be transferred to a display panel; and
    generating, by a directional pixel, the plurality of directional rays by scattering the white ray using a diffraction grating, and
    wherein each of the plurality of directional rays is incident at a corresponding subpixel included in the display panel, and
    wherein a size of the directional pixel is greater than the subpixel.

13. The method of claim 12, wherein the light source is a white light source.

14. The method of claim 13, wherein the white light source is configured as at least one of a white light emitting diode (LED) and a red, green, blue (RGB) LED chip.

15. The method of claim 13, wherein the white light source is configured as at least one of a white laser and an RGB laser chip.

16. The method of claim 12, further comprising:
    allowing a plurality of selected wavelengths of the ray to pass through.

17. The method of claim 12, wherein the directional pixel has a size less than or equal to a size of a unit pixel of the display panel.

* * * * *